(12) United States Patent
Xie (10) Patent No.: US 7,712,380 B2
(45) Date of Patent: May 11, 2010

(54) WAVEGUIDE DOPPLER FLOWMETER

(75) Inventor: Chang-gang Xie, Sawston (GB)

(73) Assignee: Schlumberger Technology Corporation, Cambridge, MA (US)

( * ) Notice: Subject to any disclaimer, the term of this patent is extended or adjusted under 35 U.S.C. 154(b) by 53 days.

(21) Appl. No.: 12/110,758

(22) Filed: Apr. 28, 2008

(65) Prior Publication Data
US 2008/0295609 A1    Dec. 4, 2008

Related U.S. Application Data

(60) Provisional application No. 60/914,139, filed on Apr. 26, 2007.

(51) Int. Cl.
*G01F 1/74* (2006.01)
(52) U.S. Cl. .................................. 73/861.04
(58) Field of Classification Search ............. 73/861.04; 702/45; 324/640
See application file for complete search history.

(56) References Cited

U.S. PATENT DOCUMENTS

| 5,049,823 | A | * | 9/1991 | Castel et al. ............. 324/640 |
| 5,485,743 | A | | 1/1996 | Taherian et al. |
| 2008/0319685 | A1 | * | 12/2008 | Xie et al. .................... 702/45 |

FOREIGN PATENT DOCUMENTS

| GB | 2359435 B | 5/2002 |
| GB | 2430493 A | 3/2007 |
| WO | 0161283 A | 8/2001 |

OTHER PUBLICATIONS

Collin, "Transmission lines and waveguides", Foundations for Microwave Engineering, second edition, McGraw Hill, 1992, pp. 196-203.
De Leeuw, "Wet gas flow measurement by means of a venturi meter and a tracer technique", North Sea Flow Measurement Workshop, Peebles, Scotland, Oct. 1994, 13 pp.
Fincke et al,. "Performance characteristics of an extended throat flow nozzle for the measurement of high void fraction multi-phase flows", Idaho National Engineering and Environmental Laboratory, 4th International Symposium Fluid Flow Measurement, Jun. 28-30, 1999, 13 pp.

(Continued)

*Primary Examiner*—Jewel Thompson
(74) *Attorney, Agent, or Firm*—James McAleenan; Vincent Loccisano; Brigid Laffey (57) ABSTRACT

Systems and methods are described for measuring flow properties of a high gas-cut multiphase mixture flowing in a conduit, such as a wet-gas produced from a hydrocarbon well. In aspects of the present invention, one or more receivers are used to receive Doppler shifted signals resulting from an interaction between a propagating dominant microwave mode developed in the conduit and the high gas-cut multiphase mixture flowing in the conduit. Analysis of the Doppler shift in the received signals may provide for determining the velocity of the gas and/or the liquid phase of the high gas-cut multiphase mixture. In other aspects, analysis of the phase difference of Doppler signals received at the plurality of receivers provides for a determination of the content of the wet-gas, such as the water holdup.

18 Claims, 2 Drawing Sheets

OTHER PUBLICATIONS

McCrometer, "V-Cone Flowmeter - a proven solution for the oil and gas industry's most difficult flow measurement problems", product information sheet, McCrometer Inc., 3255 West Stetson Avenue, Helmet, CA 92545-7763, website: http://www.mccrometer.com/library/pdf/24519-15.pdf, 6pp.

Mehdizadeh et al, "West gas metering: trends in applications and technical developments", SPE Annual Technical Conference and Exhibition, San Antonio, Texas, Sep. 29 to Oct. 2, 2002, SPE 77351, 14 pp.

Solartron ISA "Dualstream II advanced topside", product information sheet, Solartron ISA, Hackworth Industrial Park, Shildon, County Durham DL4 1LH UK, website: http://www.solartronisa.com/downloads/dualstream2-advanced-topside.pdf, 2pp.

* cited by examiner

WAVEGUIDE DOPPLER FLOWMETER

CROSS-REFERENCE TO RELATED APPLICATIONS

The present application claims priority under 35 U.S.C. §120 to U.S. Provisional Patent Application No. 60/914,139, filed on Apr. 26, 2007, entitled WAVEGUIDE DOPPLER FLOWMETER, naming Cheng-Gang Xie as inventor, which is incorporated herein by reference in its entirety for all purposes.

Embodiments of the present invention relate to systems and methods for measuring flow properties of a multiphase mixture flowing in a conduit. More specifically, but not by way of limitation, in an embodiment of the present invention, a dominant propagation mode microwave may be transmitted along the conduit and used to interrogate the flowing multiphase fluid to provide Doppler-type information that may be interpreted to determine flow properties of the multiphase mixture, including, among other things, velocities of one or more phases of the multiphase mixture, water holdup, water cut and/or the like.

BACKGROUND

In the hydrocarbon industry, it is common for a multiphase mixture comprising a gas phase and a liquid phase to be produced from a wellbore and/or to be transported through pipelines during or after production. In general, the gas phase may comprise gaseous hydrocarbons and the liquid phase may comprise oil and water. Furthermore, it is often important in the hydrocarbon industry to measure the flow properties of the components of the multiphase mixtures, including making measurements regarding the amount of the gaseous hydrocarbons in the multiphase mixture, the amount of the liquid hydrocarbons and/or water in the multiphase mixture and/or to measure the velocity of the gaseous hydrocarbons, liquid hydrocarbons and/or water in the multiphase mixture so that flow rates for the phases or components of the phases may be determined.

With the growing importance of natural gas, there exists a need in the hydrocarbon industry for an accurate determination of gas and liquid (oil and water) flow rates for wet-gas flows. Wet gas flows may be considered to comprise multiphase mixtures with a gas-volume-fraction ("GVF") or gas-cut greater than 90% or more particularly a GVF beyond 95%. Often a wet gas flow, as is often encountered in gas condensate systems, may comprise an extremely high amount of gas, i.e., the wet gas flow may have a gas cut that is 90% or may be greater than 99%. Generally, making accurate measurements of a wet-gas flow using a single-phase gas flowmeter may be difficult. Moreover, existing commercial multiphase flowmeters may deliver good performance at gas-cuts below around 95%, but may not perform well for higher gas-cut percentages. As such, to increase the gas-cut range of the multiphase flowmeter beyond 95%, some multiphase flowmeters use complicated procedures such as partial gas separation and/or flow diversion devices.

BRIEF SUMMARY

Embodiments of the present invention provide a flowmeter for measuring flow properties of a multiphase mixture flowing in a conduit, where the flowmeter is capable of operating accurately for a GVF above 90%, above 95% and even above 99%, i.e. wet-gas flows. In one embodiment of the present invention, a full-bore wet-gas flowmeter is provided in which velocity of the gas phase of a multiphase mixture may be determined by measuring the Doppler shift of a propagating microwave mode caused by the liquids entrained in the gas phase, or more particularly discontinuities in the gas phase, flowing through the conduit. In another embodiment of the present invention, a full-bore liquid flowmeter is provided in which velocity of the liquid phase of a multiphase wet-gas flow may be determined by measuring the Doppler shift of a propagating microwave mode caused by the liquid phase, or more particularly discontinuities in the annular liquid phase, flowing through the conduit. In yet another embodiment of the present invention, a dielectric constant for the wet gas may be determined from Doppler signals from a propagating microwave mode received by two or more receivers, and this dielectric constant may be used to calculate the content of the multiphase mixture, such as the water holdup. The holdup of a phase is the ratio of the volume of that phase to the total volume.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present invention provide systems and methods for measuring flow properties of a high GVF multiphase mixture flowing in a conduit, such as a wet-gas. More specifically, but not by way of limitation, in an embodiment of the present invention, one or a plurality of receivers are used to receive Doppler shifted signals resulting from an interaction between a propagating microwave mode developed in the conduit and the high GVF multiphase mixture flowing in the conduit. In certain aspects, analysis of the Doppler frequency-shift spectra may provide for determining the velocity of the gas and/or the liquid phase of the multiphase mixture. In other aspects, analysis of the phase difference of Doppler signals received at the plurality of receivers may provide for a determination of the content of the wet-gas, such as the water holdup/water cut.

In the hydrocarbon industry, a multiphase mixture comprising a wet-gas produced from a wet-gas well, may have a GVF larger than 99%. Flow regimes in a pipe from such a well, where the pipe may be a production pipe, transportation pipe or the like, especially for a vertical or near vertical pipe, may be mainly annular-mist or mist, where annular-mist flow comprises a portion of the liquid phase flowing along an inner-surface of the conduit while the remaining portion of the liquid phase is entrained in the gas flowing at the core of the pipe and a mist flow comprises essentially all of the liquid phase being entrained in the gas flowing in the pipe. Furthermore, wet-gas-type flows may provide that the flow mixture may have a narrow range of dielectric constant—e.g. in a range of about 1 to 2—may have low bulk electrical conductivity and may present little attenuation to a propagating microwave developed in the pipe.

When a wet-gas flows through a pipeline, the velocity of a cloud of entrained (water/oil) liquid droplets may be considered to be that of the carrying gas. In time, as the wet-gas flows through the pipeline, the fast-moving cloud of entrained liquid droplets may form a spatial discontinuity in the dielectric constant—wherein the discontinuity may be formed axially and/or radially and with a length scale that may be comparable to the guide wavelength, where the guide wavelength is a wavelength of a dominant wave that may be propagated along the pipe. Embodiments of the present invention provide for interrogating such discontinuities with a propagating microwave mode to determine flow properties of the wet-gas.

Figure 1:
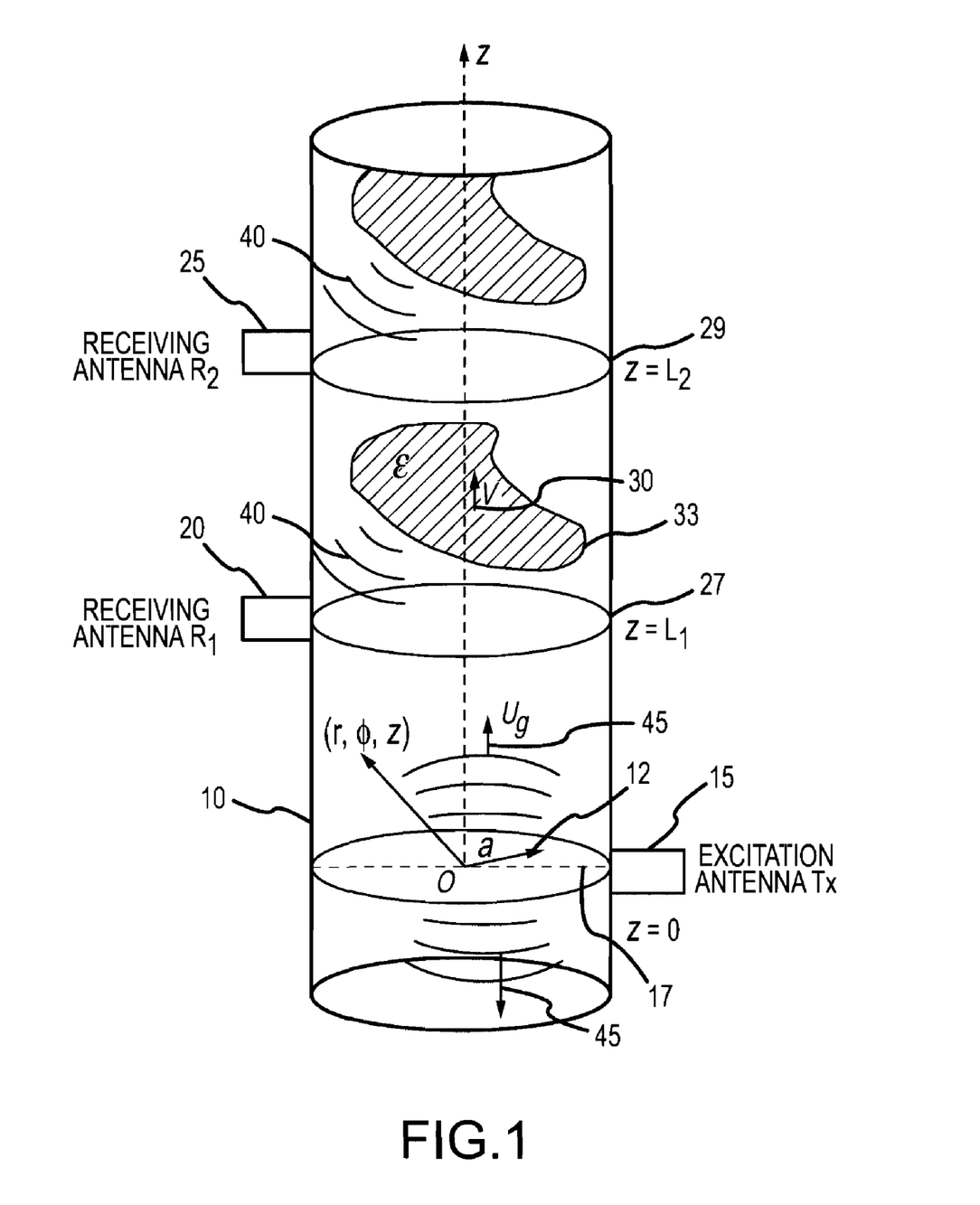
FIG. 1 is a schematic illustration of a fullbore wet gas flowmeter, in accordance with an embodiment of the present invention.

FIG. 1 illustrates a fullbore wet gas flowmeter in accordance with an embodiment of the present invention. In the depicted embodiment, a multiphase mixture (not shown) is flowing through a section of pipe 10, wherein the pipe is metallic and forms a substantially circular cylindrical waveguide. The section of pipe 10 has an inner radius $\alpha$ 12. In an embodiment of the present invention, an excitation antenna Tx 15 may be disposed at a pipe axial location z=0 17.

In an embodiment of the present invention, the flowmeter may comprise a first receiving antenna $R_1$ 20 and a second receiving antenna $R_2$ 25. As depicted in the illustrated embodiment, the receiving antennas are disposed downstream of the excitation antenna Tx 15 with the first receiving antenna $R_1$ 20 being disposed at position $z=L_1$ 27 and the second receiving antenna $R_2$ 25 being disposed at $z=L_2$ 29. In different aspects of the present invention, the receiving antennas may be disposed at locations upstream or downstream of the excitation antenna/transmitter and such configurations may include configurations comprising one receiver being located upstream of the transmitter and one receiver being located downstream of the transmitter. Moreover, in some aspects of the present invention, one of the receiving antennas may be in the same cross-sectional plane as the excitation antenna Tx 15, i.e. at the pipe axial location z=0 17. Furthermore, while the system illustrated in FIG. 1 comprises two receiving antennas, embodiments of the present invention may comprise one receiver, or three or more receivers.

In embodiments of the present invention, the excitation antenna Tx 15, the first receiving antenna $R_1$ 20 and the second receiving antenna $R_2$ 25 may be disposed at different angular positions around the section of pipe 10. In some aspects of the present invention, the excitation antenna Tx 15 may be disposed at angular or circumferential location $\phi=0$ and the receiving antennas may be positioned at $\phi=\pi$ in their respective cross-section planes, as provided in FIG. 1. In other aspects, the antennas of the system, receivers and transmitter may be disposed at the same angular position—e.g. all disposed with $\phi=0$. In some embodiments of the present invention, the system may comprise more than one transmitter and/or more than two receivers. In certain aspects, the antennas may be single-dipole and/or cross-dipole cavity-backed antennas, such as are disclosed in U.S. Pat. No. 5,485,743 and GB Patent Application No. 2 430 493 the entirety of both of which are hereby incorporated by reference.

Where the flowing multiphase mixture comprises a wet-gas mixture, the wet-gas mixture may comprise an annular-mist or mist-flow regime as it flows through the pipe section 10. A velocity v 30 (in the z direction) of a cloud of entrained liquid (water/oil) droplets at the center of the section of pipe 10 may be considered as the velocity of the carrying gas. In time, the fast-moving cloud of liquid droplets of the wet-gas mixture traveling in the section of pipe 10 may include/comprise a spatial discontinuity in the dielectric constant $\in$ 33 of the flowing wet-gas mixture, wherein the spatial discontinuity may extend axially and/or radially. In certain aspects of the present invention, if necessary, a liquid-droplet spray may be periodically injected in to the section of pipe 10 to help generate/enhance a spatial discontinuity in the dielectric constant ∈ 33.

In an embodiment of the present invention, the excitation antenna Tx 15 may be operated at a suitable frequency to launch a dominant mode propagating wave 45 into the section of pipe 10. In certain aspects, the dominant mode propagating wave 45 may comprise a single mode wave such as a $TE_{11}$ mode wave. In some embodiments, to provide for launching a dominant mode wave into the section of pipe 10, the excitation antenna Tx 15 may produce a periodic frequency sweep and analysis of multiple-receiver signals may be performed to determine an operating frequency suitably above the cutoff frequency of a dominant mode wave and below that of a next non-dominant propagating mode, which operating frequency may then be transmitted by the excitation antenna Tx 15 so as to ensure the launching of a dominant mode wave into the section of pipe 10.

In certain aspects, the operating frequency selection may be based on a determination of the multiphase mixture dielectric constant determined from the phase-difference measurement between a plurality of receiving antennas receiving the sweeping frequency passing through the multiphase mixture. In other embodiments, modeling, theoretical analysis, previous experience, experimentation or the like may be used to determine a frequency of a dominant mode in the section of pipe 10. In an embodiment of the present invention, antenna excitation frequency f may be selected to provide that a single-mode wave is launched into the section of pipe 10 and that the single mode wave travels along the axis of the section of pipe 10 at a velocity $u_g$.

In certain embodiments, the excitation antenna Tx 15 may be used to launch a single dominant mode (such as $TE_{11}$) propagating wave in the section of pipe 10 and the receiving antennas may be used to detect Doppler shifted waves 40 generated or reflected from the moving spatial discontinuity in the dielectric constant ∈ 33. In an embodiment of the present invention, the detected Doppler shifted waves 40 may be analyzed to determine a Doppler frequency of the detected Doppler shifted waves 40 and/or a phase difference between the Doppler shifted waves detected by the first receiving antenna $R_1$ 20 and the second receiving antenna $R_2$ 25.

In certain aspects of the present invention, a high gas-cut mist flow in the pipeline may have a dielectric constant ∈ between 1 and around 2. In such aspects, the fluid mixture electrical conductivity may be low and the attenuation to a propagating wave may be small. Merely by way of example, Table 1 lists, for a 2" pipe with radius a=25 mm, the cutoff frequency $f_c$ for the dominant $TE_{11}$ mode and the next TE mode ($TE_{21}$) when the pipe is full of dry gas (∈≈1), of wet gas of annular-mist to mist flows with ∈≤~2, and of oil-continuous gas-liquid flows (with the liquid phase comprising water droplets dispersed in oil) with ∈≤~20.

TABLE 1

Cutoff frequency $f_c$ for dominant $TE_{11}$ mode and $TE_{21}$ mode in a circular metallic waveguide pipe of radius a = 25 mm, for pipe full of dry gas (for oil-droplets/gas flow), wet-gas (for water-droplets/gas flow) and an oil-continuous gas/liquid flow.

|  | $TE_{11}$ mode $f_c = 0.293c_o/(a\sqrt{\epsilon})$ | $TE_{21}$ mode $f_c = 0.486c_o/(a\sqrt{\epsilon})$ |
|---|---|---|
| Dry gas ∈ = 1 | $f_c$ = 3.52 GHz | $f_c$ = 5.83 GHz |
| Wet gas ∈ = 2 | $f_c$ = 2.49 GHz | $f_c$ = 4.12 GHz |
| Oil continuous flow ∈ = 20 | $f_c$ = 0.79 GHz | $f_c$ = 1.30 GHz |

In one embodiment of the present invention, the multiphase mixture may comprise an oil-continuous (water droplets dispersed in oil) flow and the oil-continuous liquid may flow along the inner wall of the section of pipe 10. In such an embodiment, Doppler shifted reflected waves may be produced by the interaction between the propagating dominant mode wave 45 and discontinuities in the liquid flowing on the inner-surface of the section of pipe 10.

In an embodiment of the present invention, a processor, software and/or the like may be used to process the detected Doppler shifted waves 40 to determine properties of the flowing multiphase mixture. In an embodiment of the present invention where the liquid-entrained gas cloud dominates the flow of the flowing multiphase mixture, the Doppler modulation of the dominant mode propagating wave 45, the frequency $f_r$ of the wave signal received by the first receiving antenna $R_1$ 20 and/or the second receiving antenna $R_2$ 25 is:

$$f_r = f + f(v/u_g)\cos\alpha$$

The corresponding Doppler shift frequency is given by:

$$f_D \leq f_r - f = f(v/u_g)\cos\alpha \quad (1a)$$

where α is the angle of wave propagation with respect to the flow axial z direction, which for the dominant mode propagating wave 45 is substantially zero (0) since the dominant mode propagating wave 45 and the multiphase mixture flow are propagating axially along the section of pipe 10 in the same direction, or is substantially equal to π where the dominant mode propagating wave 45 and the multiphase mixture are counter-propagating, i.e., where one of the receivers is upstream of the excitation antenna Tx 15.

The propagating wave velocity $u_g$ may be determined/estimated by measuring the difference in the phase-shifts ($\theta_1$ and $\theta_2$) of the signals received by the receivers, the first receiving antenna $R_1$ 20 and the second receiving antenna $R_2$ 25. For a one-receiver system, the phase difference may be determined from the phase-shift of the signal received by the single receiver relative to the phase-shift of the transmitter. Determination of the wave velocity $u_g$ is discussed in more detail below. From the measured Doppler frequency shift $f_D$ and the estimated wave propagation velocity $u_g$, the gas velocity v may be derived as:

$$v = u_g(f_D/f)/\cos\alpha \quad (1b)$$

In one embodiment of the present invention, the amplitude and phase of the dominant mode propagating wave 45 and the reflected Doppler waves 40 may be obtained by using a complex discrete Fourier transform ("DFT") or the like. The receiver amplitude-attenuation (M) and phase-shift (θ) may be computed with reference to the amplitude and phase of the dominant mode propagating wave 45 generated at the excitation antenna 15. Processing of receiver amplitude-ratio and/or phase-difference may provide in certain embodiments of the present invention for determining the mixture dielectric constant. From the determined mixture dielectric constant, in various aspects of the present invention, the water holdup and/or the water-cut may be determined. With regard to such determinations the GB Patent Application GB 2 430 493 is hereby incorporated by reference in its entirety. In other aspects, the fast DFT processing or the like may also be used to obtain the frequency spectrum of the received Doppler signals and/or to provide for identifying the Doppler shift frequency ($f_D$). As provided above, the determined Doppler shift frequency may be used in an embodiment of the present invention to process flow velocity. In some embodiments, the computations may be performed by a digital signal processor ("DSP") or the like. In certain aspects, numerical results from the DSP may be converted to a form suitable for transmission and/or display.

In certain aspects of the present invention, the cutoff wavenumber of the $TE_{11}$ mode is $k_c=1.84/a=2\pi f_c\sqrt{\in}/c_o$ (where the wave velocity in the free-space $c_o=1/\sqrt{\mu \in_o}=3\times 10^8$ m/s); the wavenumber k of the flow medium is $k=2\pi f\sqrt{\in}/c_o=k_o\sqrt{\in}$ ($k_o=\omega/c_o$). The propagation constant $\beta$ of the $TE_{11}$ wave along the pipe axial (z) direction is:

$$\beta=\sqrt{k^2-k_c^2}=\sqrt{(\omega/c)^2-k_c^2}=\sqrt{\in k_o^2-k_c^2} \quad (2)$$

Table 2 lists, for the $TE_{11}$ mode, the axial magnetic field $H_z$ and the transverse electric (TE) field ($E_r$, $E_\phi$) in a circular waveguide; they can generally be expressed as $F(r,\phi,z)=G(r,\phi)e^{-j\beta z}$.

TABLE 2

In polar coordinates (r, $\phi$, z), the electric (E) and magnetic (H) fields of $TE_{11}$ mode in a circular metallic pipe of radius a (A = arbitrary constant; $J_1$ = the Bessel function of the first kind (first order).

| $E_z = 0$ | $H_z = AJ_1(k_c r)e^{-j\beta z} \cos \phi$ |
|---|---|
| $E_r = \dfrac{j\omega\mu}{k_c^2 r} AJ_1(k_c r)e^{-j\beta z} \sin \phi$ | $E_\phi = \dfrac{j\omega\mu}{k_c} AJ'_1(k_c r)e^{-j\beta z} \cos \phi$ |

From equation 2, the guide wavelength may be derived as:

$$\lambda_g=2\pi/\beta=2\pi/\sqrt{k^2-k_c^2}=\lambda\sqrt{1-(f_c/f)^2} \quad (3)$$

with $\lambda=\lambda_o/\sqrt{\in}$ and $\lambda_o=c_o/f$. Generally $\lambda_g\geq\lambda$. Discontinuities in $\in$ along the z direction, in the cloud of liquid droplets in gas, or in the form of gas plugs/slugs/churns, or in liquid-layer flowing along the inner-wall of the section of pipe 10 of a length scale comparable to $\lambda_g$ may be the source of Doppler shift in the signals received by the first receiving antenna $R_1$ 20 and the second receiving antenna $R_2$ 25. Table 3 lists some example guide wavelength $\lambda_g$ for wet-gas and oil-continuous flows at suitably chosen operating frequency (f) in relation to the $TE_{11}$ mode cutoff frequency ($f_c$). Merely by way of example, in certain aspects values of $L_1$ may be of the order of 50 mm and $L_2$ of the order of 150 mm. In other examples $L_1$ may be of the order of 0 mm with $L_2$ of the order of 100 mm. In yet other examples, $L_1$ may be of the order of −50 mm with $L_2$ of the order of 50 mm etc. In yet other aspects of the present invention, more than two receivers, which in some aspects may be more closely spaced axially than dual receiver embodiments, may be used to provide for measurements over a wider range of flow conditions.

the waveguide and may also be referred to as the group velocity. The wave velocity $u_g$ 45 is the velocity with which a signal consisting of a narrow band of frequency components propagates. In a waveguide, as shown in Table 2, the propagation factor $e^{-j\beta z}$ is the major frequency-dependent part of the field. Thus a waveguide of length L, in which the field has a time dependence $e^{j\omega t}$, can be considered as a frequency filter with a response $e^{-j\beta L}$ (since $\beta$ is of function of $\omega$). For narrow-band signals a waveguide produces very little distortion (frequency dispersion) unless a very long guide is used.

For a waveguide, from equation 2, the group velocity may be derived as:

$$u_g=(d\beta/d\omega)^{-1}=u\sqrt{1-(f_c/f)^2} \quad (4)$$

with $u=c_o/\sqrt{\in}$, $u_g \leq u$ with $u_g=1.42\times 10^8$ and $1.18\times 10^8$ m/s from dry-gas to wet-gas flows when f=4 and 3 GHz respectively (See Table 3 above). In such regimes, this corresponds to a Doppler-shift sensitivity ($f/u_g$) of the order of 25 Hz per (m s$^{-1}$) for a flow velocity change, with cos $\alpha$=1.

Rearranging the waveguide cutoff frequency as $f_c=[k_c/(2\pi)]u$, equation 4 becomes:

$$u_g^2 = u^2\left[1-\left(\frac{k_c}{2\pi}\right)^2\frac{u^2}{f^2}\right] \quad (5)$$

Therefore, an estimate of wave velocity u may provide for deriving the group velocity $u_g$ that may in turn, in an embodiment of the present invention, be used to determine the Doppler frequency-shift according to equation (1b). The dielectric constant $\in$ for the flowing multiphase mixture (since $u=c_o/\sqrt{\in}$) may be obtained from equation 2 as:

$$\in=(\beta^2+k_c^2)/k_o^2 \quad (6)$$

In certain aspects, the wave propagation constant $\beta$ may be calculated from the phase difference between the two receivers, the first receiving antenna $R_1$ 20 and the second receiving antenna $R_2$ 25, according to the following relationship or the like:

$$\beta=(\theta_2-\theta_1)/(L_2-L_1) \quad (7)$$

From the above equation, in an embodiment of the present invention, a receiver's axial location L (comparable to guide wavelength $\lambda_g$) may be selected to provide that sufficient receiver phase change may be measured and/or excessive phase wrap avoided. In such an embodiment, a measurement

TABLE 3

For dry gas, wet gas flow and oil-continuous flow (with $\epsilon \approx 20$), the guide wavelength $\lambda_g$ and the group velocity $u_g$ are given at operating frequency f for the $TE_{11}$ mode in a circular pipe of radius a = 25 mm.

| Operating frequency f (and cutoff-frequency ratio $f_c/f$) | Guide wavelength $\lambda_g$ $\lambda_g = \lambda\sqrt{1-(f_c/f)^2}$ | Wave group velocity $u_g$ $u_g = u\sqrt{1-(f_c/f)^2}$ |
|---|---|---|
| Dry gas $\epsilon \approx 1$ | $\lambda = c_o/(f\sqrt{\epsilon}) = 75$ mm | $u = c_o = 3 \times 10^8$ m/s |
| f = 4 GHz ($f_c/f = 3.52/4 = 0.88$) | $\lambda_g = 158$ mm | $u_g = 1.42 \times 10^8$ m/s |
| Wet gas $\epsilon \approx 2$ | $\lambda = c_o/(f\sqrt{\epsilon}) = 71$ mm | $u = c_o/\sqrt{\epsilon} = 2.12 \times 10^8$ m/s |
| f = 3 GHz ($f_c/f = 2.49/3 = 0.83$) | $\lambda_g = 127$ mm | $u_g = 1.18 \times 10^8$ m/s |
| Oil continuous flow with $\epsilon \approx 20$ | $\lambda = c_o/(f\sqrt{\epsilon}) = 67$ mm | $u = c_o/\sqrt{\epsilon} = 0.67 \times 10^8$ m/s |
| f = 1 GHz ($f_c/f = 0.79/1 = 0.79$) | $\lambda_g = 109$ mm | $u_g = 0.41 \times 10^8$ m/s |

The propagating wave velocity $u_g$ 45, as provided in equation 1, provides the signal/energy propagation velocity along of the mixture dielectric-constant may be achieved. In certain aspects, by subtracting the phases between the two receivers, the phase drift due to thermal variation in the transmitting and receiving parts of the microwave electronics may be minimized. While there may be a weak effect of flow velocity on the phase shift measured in an embodiment of the present invention, this phase shift may only give rise to negligible, higher order corrections in equation (1a) and equation (1b).

In embodiments of the present invention, the flow mixture dielectric constant may be processed using the phase-difference between the signals received by different receivers. For example, the phase difference may be applied to equations 6 and 7 to determine the flow mixture dielectric constant. The flow mixture dielectric constant may be used with an appropriate dielectric mixing law or the like to determine properties of the multiphase mixture, including water holdup in the wet-gas stream or the like. In certain aspects, the combination of the amplitude and phase of the signal(s) received by the receivers may be processed to determine water holdup in the wet-gas and multiphase flows and/or the like. An example of determining water holdup from amplitude and phase of signals passed through a multiphase flow is provided in GB Patent Application No. 2 430 493, the entirety of which is hereby incorporated by reference for all purposes.

In other aspects, the magnitude and/or phase of signals received by the first receiving antenna $R_1$ 20 and the second receiving antenna $R_2$ 25 may be cross-correlated to obtain a flow velocity estimate or the like. For example, the magnitude and/or the phase of signals received by the receivers, the first receiving antenna $R_1$ 20 and the second receiving antenna $R_2$ 25, may be used to track the movement of the discontinuities between the first receiving antenna $R_1$ 20 and the second receiving antenna $R_2$ 25 and using the known axial distance between the first receiving antenna $R_1$ 20 and the second receiving antenna $R_2$ 25 the velocity of the gas component or the liquid component of the multiphase mixture may be determined.

Figure 2:
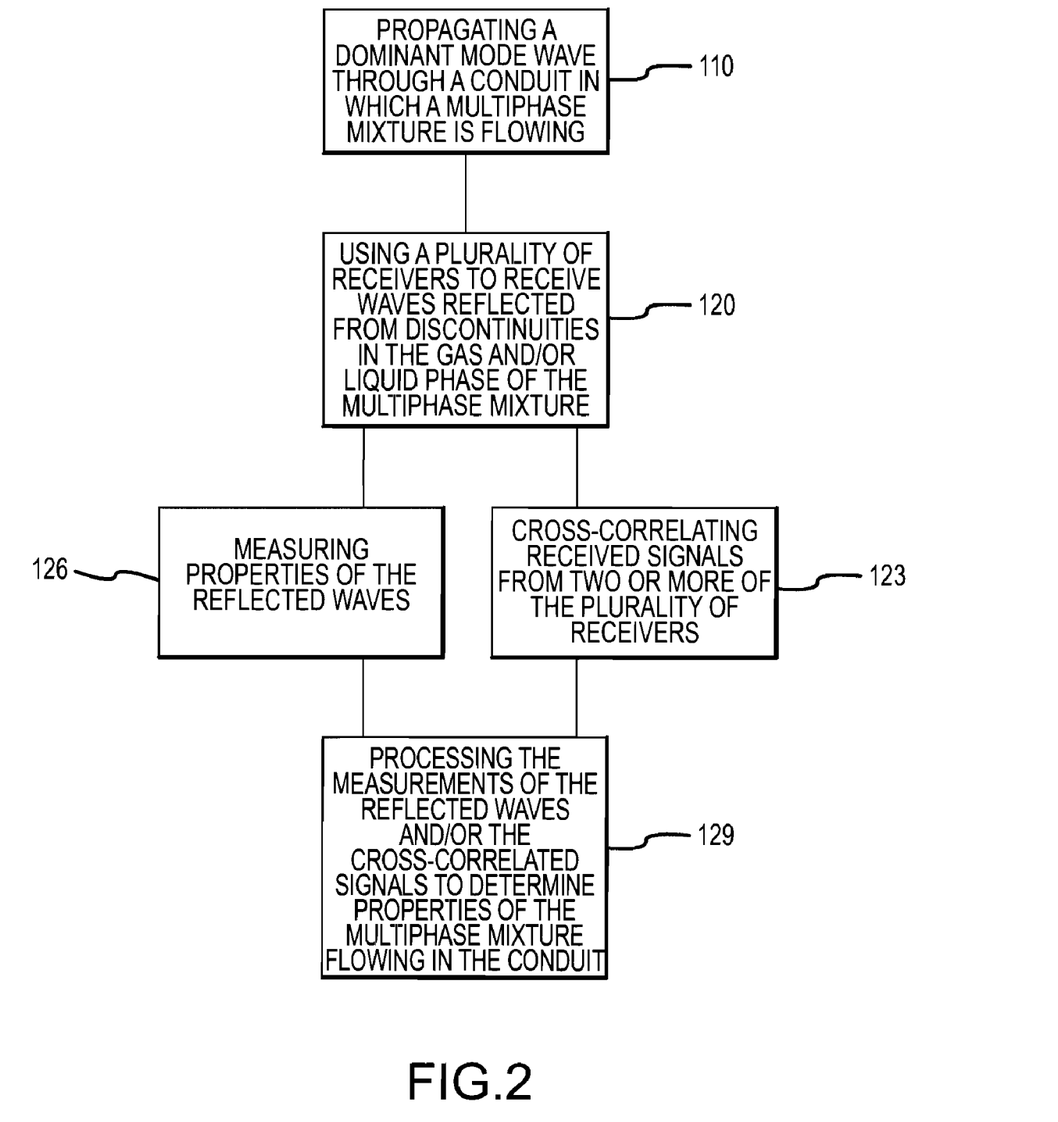
FIG. 2 is a flow type diagram of a method for using a propagating microwave mode to determine flow properties of a wet-gas-multiphase-mixture flowing in a conduit.

FIG. 2 is a flow-type diagram of a method for using a propagating microwave mode to determine flow properties of a wet-gas-multiphase-mixture flowing in a conduit. In accordance with an embodiment of the present invention, in step 110 a dominant mode wave is propagated along the conduit. In certain aspects, the dominant mode wave may comprise a single mode, such as the $TE_{11}$ mode. The dominant mode wave may be transmitted from a transmitting antenna or the like and may comprise a microwave range. The operating frequency for launching the dominant mode wave may be determined by periodically transmitting a sweep frequency into the conduit and processing outputs from one or more receiving antennas positioned along the conduit.

In step 120, a plurality of receivers may be used to receive reflections of the propagating microwave mode from discontinuities in the dielectric constant of the wet-gas and/or discontinuities in the flow of the liquid phase of the multiphase mixture. Where the multiphase mixture is a wet-gas, the flowing multiphase mixture may comprise a gas core of entrained liquid droplets. As this mist type flow flows through the conduit, spatial discontinuities in the dielectric constant may be formed. The spatial discontinuities may extend axially and/or radially. The spatial discontinuities in the dielectric constant of the gas-core mist-type flow may serve as points of Doppler-inducing reflection for the propagating microwave mode. In a different aspect of the present invention, when the multiphase mixture is a wet gas, the liquid phase of the multiphase mixture may comprise an annular liquid layer flowing along the inner-surface of the conduit. This liquid flow may comprise discontinuities such as moving wave-structures at the gas-liquid interface, droplet size variations in the moving oil-water liquid layer, turbulence in flow and/or the like, which may serve as Doppler-inducing reflection points for the propagating microwave mode. Analysis of the annular liquid phase Doppler velocity in this manner may be possible when the multiphase mixture comprises an oil-continuous liquid flow or a water-continuous liquid flow containing low-salinity fresh water, where the overall flow has a low electrical loss so providing for propagation of the dominant mode microwave through the multiphase mixture in the conduit. In certain aspects of the present invention, for measurement purposes, liquid oil/water may be sprayed in the wet-gas mixture upstream of the measurement location to alter the properties of the flowing multiphase mixture. For an annular-mist type wet-gas flow where a fasting-moving gas-core with entrained liquid droplets and a slow-moving liquid-layer at the pipe wall co-exists, appropriate processing the received Doppler signal with a broad frequency spectrum may lead to the determination of both gas-core and liquid-layer velocities.

In steps 123 and 126 the outputs from the plurality of receivers may be analyzed. In step 123, outputs from two or more of the plurality of receivers may be cross-correlated. In step 126 the wavelength of the propagating reflected waves, the Doppler frequency of the received reflected waves, the phase shifts of the received waves relative to the propagating microwave mode and/or the like may be measured. In step 129, the measured properties of the received reflected waves and/or the cross-correlated signals may be processed to determine gas and/or liquid velocities and the water fraction. In certain aspects, the cross-correlated signals may be processed to determine the time taken for a discontinuity to pass between two receivers from which, knowing the axial separation of the receivers, a velocity of a gas or a liquid phase of the multiphase mixture may be determined. In different aspects of the present invention, where the multiphase mixture comprises a wet-gas, the wet-gas velocity may be determined from the Doppler frequency shift of the reflected waves relative to the propagating microwave mode. In further aspects of the present invention, an estimate of the dielectric constant of the multiphase mixture may be processed from the phase difference of reflected waves received at a plurality of receivers and this estimate of the dielectric constant may be further processed to determine the water holdup of the multiphase mixture.

While the principles of the disclosure have been described above in connection with specific apparatuses and methods, it is to be clearly understood that this description is made only by way of example and not as limitation on the scope of the invention.

What is claimed is:

1. A method for measuring flow properties of a multiphase-hydrocarbon-mixture flowing in a conduit, comprising:
   propagating a dominant mode microwave signal along the conduit through the multiphase-hydrocarbon-mixture;
   receiving a first Doppler shifted signal;
   receiving a second Doppler shifted signal, wherein the first and the second Doppler shifted signals are received at different locations along the conduit, the different locations being separated by a known distance, and wherein the first and the second Doppler shifted signals comprise interactions of the propagating dominant mode microwave signal with the flowing multiphase mixture; and
   processing the received Doppler shifted signals to determine flow properties of the multiphase-hydrocarbon-mixture.

2. The method of claim 1, wherein the first and the second Doppler shifted signals comprise interactions of the propagating dominant mode microwave signal with discontinuities in the dielectric constant of a gas phase of the multiphase-hydrocarbon-mixture, wherein the gas phase is entrained with liquid droplets.

3. The method of claim 2, wherein the received Doppler shifted signals are processed to determine a velocity of the gas phase.

4. The method of claim 1, wherein the first and the second Doppler shifted signals comprise interactions of the propagating dominant mode microwave signal with discontinuities in a flow of a liquid phase of the multiphase-hydrocarbon-mixture.

5. The method of claim 4, wherein the received Doppler shifted signals are processed to determine a velocity of the liquid phase.

6. The method of claim 1, wherein the phase-difference and/or the magnitude-ratio of received Doppler shifted signals are processed to determine a water holdup in the multiphase-hydrocarbon-mixture.

7. The method of claim 1, wherein a frequency of the propagating dominant mode microwave signal is determined by transmitting a sweep of microwave signals of different frequencies into the conduit through the multiphase-hydrocarbon-mixture and measuring properties of the transmitted signals at one or more locations along the conduit.

8. The method of claim 1, wherein the propagating dominant mode microwave signal comprises a $TE_{11}$ mode.

9. The method of claim 1, further comprising:
spraying, a liquid into the flowing multiphase-hydrocarbon-mixture to generate and/or enhance discontinuities in the dielectric constant.

10. The method of claim 1, wherein the step of processing the received Doppler shifted signals to determine the flow properties of the multiphase-hydrocarbon-mixture comprises cross-correlating the received signals.

11. The method of claim 1, wherein the step of processing the received Doppler shifted signals to determine the flow properties of the multiphase-hydrocarbon-mixture comprises determining a dielectric constant of the multiphase-hydrocarbon-mixture from a phase difference between the first Doppler shifted signal and the second Doppler shifted signal.

12. The method of claim 11, wherein the value of the dielectric constant is used to control a frequency of the dominant mode microwave signal.

13. The method of claim 11, wherein the value of the dielectric constant is used to determine a wave propagation velocity of the dominant mode microwave for the gas and/or the liquid phase velocity calculation from the received Doppler shifted signals.

14. The method of claim 11, wherein the value of the dielectric constant is used to determine a water holdup or water-cut of the multiphase-hydrocarbon-mixture.

15. A system for measuring flow properties of a multiphase-hydrocarbon-mixture flowing in a conduit, comprising:
a microwave transmitter configured to launch a single dominant propagating microwave mode in a circular metal-wall pipe;
a plurality of microwave receivers configured to receive Doppler shifted signals, wherein the Doppler shifted signals comprise interactions of the propagating microwave mode with the flowing multiphase-hydrocarbon-mixture; and
a processor configured to determine a value of Doppler shift from the received Doppler shifted signals and to process the flow properties from the value of the Doppler shift.

16. The system of claim 15, wherein the microwave transmitter is configured to operate at a suitable frequency to launch a single $TE_{11}$ mode microwave along the conduit.

17. A method for measuring flow properties of a multiphase mixture flowing in a conduit, comprising:
determining a dielectric constant value for the multiphase mixture;
using the determined dielectric constant to process a cut-off frequency for launching a single dominant mode in the conduit;
using a transmitter to transmit a signal at a frequency above the cut-off frequency of the dominant mode and below a cut-off frequency of the next propagating mode; and
measuring a Doppler shift of signals received at a plurality of receivers disposed at different locations along the conduit.

18. The method of claim 17, wherein the step of determining a dielectric constant value for the multiphase mixture comprises passing a frequency sweep through the multiphase mixture and measuring a phase difference between received signals from two antennas disposed at different locations along the conduit.

* * * * *

UNITED STATES PATENT AND TRADEMARK OFFICE
CERTIFICATE OF CORRECTION

PATENT NO. : 7,712,380 B2  Page 1 of 1
APPLICATION NO. : 12/110758
DATED : May 11, 2010
INVENTOR(S) : Cheng-gang Xie It is certified that error appears in the above-identified patent and that said Letters Patent is hereby corrected as shown below:

Name of the inventor is spelled: Cheng-gang Xie

The formula (1a) at column 6 line 21 should read:

$$f_D = f_r - f = f(v/u_g)\cos \alpha \qquad (1a)$$

The formula for guide wavelength in the middle column of Table 3 should appear as $$\lambda_g = \lambda \Big/ \sqrt{1-(f_c/f)^2}$$

Signed and Sealed this

Thirty-first Day of August, 2010

David J. Kappos
*Director of the United States Patent and Trademark Office*